(12) United States Patent
Chen et al.

(10) Patent No.: US 7,287,014 B2
(45) Date of Patent: Oct. 23, 2007

(54) PLAUSIBLE NEURAL NETWORK WITH SUPERVISED AND UNSUPERVISED CLUSTER ANALYSIS

(76) Inventors: Yuan Yan Chen, 11351 Oakhurst La., Woodbridge, VA (US) 22192; Joseph Chen, 11351 Oakhurst La., Woodbridge, VA (US) 22192

( * ) Notice: Subject to any disclaimer, the term of this patent is extended or adjusted under 35 U.S.C. 154(b) by 584 days.

(21) Appl. No.: 10/294,773

(22) Filed: Nov. 15, 2002

(65) Prior Publication Data
US 2003/0140020 A1 Jul. 24, 2003

Related U.S. Application Data

(60) Provisional application No. 60/331,476, filed on Nov. 16, 2001.

(51) Int. Cl.
*G06E 1/00* (2006.01)
*G06E 3/00* (2006.01)
*G06F 15/18* (2006.01)
*G06G 7/00* (2006.01)

(52) U.S. Cl. ........................................ 706/16
(58) Field of Classification Search ............... 706/1–44
See application file for complete search history.

(56) References Cited

U.S. PATENT DOCUMENTS 5,835,901 A * 11/1998 Duvoisin et al. ............. 706/19
6,167,391 A * 12/2000 Lawrence .................... 706/26
6,894,639 B1 * 5/2005 Katz ............................ 342/90
2002/0010691 A1 1/2002 Chen

OTHER PUBLICATIONS

Eugene M. Izhikevich, "Class 1 Neural Excitability, Conventional Synapses, Weakly Connected Networks, and Mathematical Foundations of Pulse-Coupled Models", *IEEE Transactions on Neural Networks*, vol. 10, No. 3, pp. 499-507 (May 1999).
Ralf Salomon, "Neural Networks in the Context of Autonomous Agents: Important Concepts Revisited", AI Lab, Computer Science Department, University of Zürich, pp. 1-8.

* cited by examiner

*Primary Examiner*—Anthony Knight
*Assistant Examiner*—Michael B. Holmes
(74) *Attorney, Agent, or Firm*—Roylance, Abrams, Berdo & Goodman, L.L.P.

(57) ABSTRACT

A plausible neural network (PLANN) is an artificial neural network with weight connection given by mutual information, which has the capability of inference and learning, and yet retains many characteristics of a biological neural network. The learning algorithm is based on statistical estimation, which is faster than the gradient decent approach currently used. The network after training becomes a fuzzy/belief network; the inference and weight are exchangeable, and as a result, knowledge extraction becomes simple. PLANN performs associative memory, supervised, semi-supervised, unsupervised learning and function/relation approximation in a single network architecture. This network architecture can easily be implemented by analog VLSI circuit design.

12 Claims, 9 Drawing Sheets

Conditional probability of attributes given the cluster

| | hair | feathers | eggs | milk | airborne | aquatic | predator | toothed | backbone | breathes | venomous | fins | no legs | 2 legs | 4 legs | 5 or more | tail | domestic | catsize |
|---|---|---|---|---|---|---|---|---|---|---|---|---|---|---|---|---|---|---|---|
| $C_1$ | 1 | 0 | 0 | 1 | 0.4 | 0 | 0 | 1 | 1 | 1 | 0 | 0 | 0 | 1 | 0 | 0 | 0 | 0.2 | 0.6 |
| $C_2$ | 0 | 0 | 1 | 0 | 0 | 1 | 0.69 | 1 | 1 | 0 | 0.08 | 1 | 1 | 0 | 0 | 0 | 1 | 0 | 0 |
| $C_3$ | 1 | 0 | 0 | 1 | 0 | 0 | 0 | 1 | 1 | 1 | 0 | 0 | 0 | 0 | 1 | 0 | 0.9 | 0.23 | 0.77 |
| $C_4$ | 0 | 0 | 1 | 0 | 0 | 0 | 0 | 0 | 1 | 1 | 0 | 0 | 0 | 0 | 1 | 0 | 1 | 0 | 1 |
| $C_5$ | 0.67 | 0 | 0 | 1 | 0 | 1 | 1 | 0.83 | 1 | 1 | 0 | 0.67 | 0.5 | 0 | 0 | 0 | 0.83 | 0 | 1 |
| $C_6$ | 0 | 1 | 1 | 0 | 0.8 | 0 | 0 | 0 | 1 | 1 | 0 | 0 | 0 | 1 | 0 | 0 | 1 | 0.15 | 0 |
| $C_7$ | 0 | 0 | 1 | 0 | 0 | 0.86 | 1 | 0 | 0 | 0 | 0.14 | 0 | 0.29 | 0 | 0 | 0.57 | 0 | 0 | 0 |
| $C_8$ | 0 | 0 | 1 | 0 | 0 | 0.75 | 0.75 | 1 | 1 | 1 | 0 | 0 | 0 | 0 | 1 | 0 | 0 | 0 | 0 |
| $C_9$ | 0 | 0 | 0.67 | 0 | 0 | 0 | 1 | 1 | 1 | 0 | 0.67 | 0 | 1 | 0 | 0 | 0 | 1 | 0 | 0 |
| $C_{10}$ | 0 | 0 | 0.91 | 0 | 0.55 | 0 | 0 | 0 | 0 | 1 | 0.27 | 0 | 0 | 0 | 0 | 0.82 | 0 | 0 | 0 |

Figure 6A

· List of the animals in the clusters

| | | | | | | | | | | | | |
|---|---|---|---|---|---|---|---|---|---|---|---|---|
| $C_1$ | fruitbat | girl | gorilla | vampire | wallaby | | | | | | | |
| $C_2$ | bass | carp | catfish | chub | dogfish | haddock | herring | pike | piranha | seahorse | sole | stingray | tuna |
| $C_3$ | aardvark | antelope | bear | boar | buffalo | calf | cavy | cheetah | deer | elephant | giraffe | goat | hamster |
| | hare | leopard | lion | lynx | mole | mongoose | opossum | oryx | polecat | pony | puma | pussycat | raccoon |
| | reindeer | squirrel | vole | wolf | | | | | | | | | |
| $C_4$ | tortoise | | | | | | | | | | | | |
| $C_5$ | dolphin | mink | platypus | porpoise | seal | sealion | | | | | | | |
| $C_6$ | chicken | crow | dove | duck | flamingo | gull | hawk | kiwi | lark | ostrich | parakeet | penguin | pheasant |
| | rhea | skimmer | skua | sparrow | swan | vulture | wren | | | | | | |
| $C_7$ | clam | crab | crayfish | lobster | octopus | seawasp | starfish | | | | | | |
| $C_8$ | frog | newt | toad | tuatara | | | | | | | | | |
| $C_9$ | pitviper | seasnake | slowworm | | | | | | | | | | |
| $C_{10}$ | flea | gnat | honeybee | housefly | ladybug | moth | scorpion | slug | termite | wasp | worm | | |

Figure 6B

Fuzzy membership of the animals belonging to the clusters*

| | | | |
|---|---|---|---|
| $C_3$ | mink (96) | | |
| $C_4$ | platypus (83) | | |
| $C_7$ | slug (83) | worm (83) | scorpion (76) |

*possibilistic fuzzy membership (> 75).

Figure 6C

| Threshold | 0.05 | 0.1 | 0.15 | 0.2 | 0.25 | 0.3 | 0.35 | 0.4 | 0.45 | 0.5 |
|---|---|---|---|---|---|---|---|---|---|---|
| Accuracy | 92.0 | 90.3 | 88.5 | 86.1 | 85.6 | 84.7 | 84.7 | 84.4 | 83.2 | 82.6 |
| Avg number of class neurons | 10.4 | 6.6 | 4.6 | 3.2 | 2.3 | 2.1 | 2.1 | 2.1 | 2.1 | 2.0 |

| Threshold | 0.55 | 0.6 | 0.65 | 0.7 | 0.75 | 0.8 | 0.85 | 0.9 | 0.95 | 1 |
|---|---|---|---|---|---|---|---|---|---|---|
| Accuracy | 81.4 | 80.8 | 78.8 | 78.2 | 75.8 | 70.8 | 64.6 | 61.4 | 57.5 | 50.2 |
| Avg number of class neurons | 2.0 | 1.9 | 1.9 | 1.8 | 1.7 | 1.6 | 1.4 | 1.3 | 1.2 | 1.0 |

Figure 7

*The solid line are the predictions, the dotted lines are the actual time series.

PLAUSIBLE NEURAL NETWORK WITH SUPERVISED AND UNSUPERVISED CLUSTER ANALYSIS

This application claims priority under 35 U.S.C. §119(e) from U.S. Provisional Patent Application Ser. No. 60/331,476, filed Nov. 16, 2001, the entire content of which is incorporated herein by reference.

FIELD OF THE INVENTION

The present invention is related to neural networks. In particular, the invention is related to a neural network model that uses a statistical inference model, under which the computation and inference of the model is both possibilistic and probabilistic in nature.

BACKGROUND OF THE INVENTION

The relationship of neural computation and inference has long been investigated (see, e.g., McCulloch, W. S. and Pitts, "A Logical Calculus of Ideas Immanent in Neuron Activity," *Bulletin of Mathematical Biology* 5, pp. 115-133 (1943); Baum, E. B. and Wilczek, F., "Supervised Learning of Probability Distributions by Neural Networks," *Neural Information Processing Systems*, pp. 52-61 (1988); and Hopfield, J. J., "Learning Algorithm and Probability Distributions in Feed-Forward and Feed-Back Networks," *Proceeding of the National Academy of Science*, pp. 8429-8433 (1987)). Most of these researchers use neural network computation to explain the origin of Boolean logic or the connection with probability inference. When dealing with the logical truth of a proposition or the belief of a hypothesis, there are many terms associated with it, including certainty factor, support, confirmation and confidence level.

Historically these are considered subjective or epistemic, which is not the same as chance or aleatory probability that is associated with a random variable. Although conceptually different, whether the epistemic probability should follow the same rule as aleatory probability has always been at the center of debate. If the epistemic probability has a different rule, then it must come from the law of thought, or more precisely, the emergent property of neural computation.

Neural processing is often aimed at detecting differences in action potential rather than absolute values. For example, neural processing detects contrast rather than pure luminance, edges rather than areas, and so on. In evidential reasoning the difference in action potential means the weight of evidence favors the hypothesis, which in turn can be transformed into the belief of the possibility measure. The competitive nature of neuron activities induces the belief judgment.

A plausible neural network (PLANN) model that can compute probabilistic and possibilistic and other kinds of fuzzy logic is described herein. The learning algorithm of PLANN is discussed in U.S. patent application Ser. No. 09/808,101, which is incorporated herein by reference in its entirety. The present application describes a more detailed architecture and activation model of PLANN, which facilitates the computation of PLANN inference.

SUMMARY OF THE INVENTION

Many researchers have observed that neurons process information in an imprecise manner. If a logical inference emerges from neural computation, it is inexact at best. Thus, there must be a profound relationship between belief logic and neural networks. In this application a plausible neural network model that can compute probabilistic and fuzzy logic is described. The architecture of the networks and its hardware design, which is an essential component of a plausible thinking machine, is described below.

According to an embodiment of the present invention, the PLANN computation is based on the interaction of cooperative and competitive processes in a computational system. The cooperative nature results from the entropy increase in a linear dissipative system; the competitive nature results from the energy conservation in a nonlinear passive system (see, e.g., Elfadel, I. M. and Wyatt, J. L., "The Softmax Nonlinearity: Derivation Using Statistical Mechanics and Useful Properties as a Multi-Terminal Analog Circuit Element," *Advances in Neural Information Processing Systems* 6, pp. 882-887 (1994)). Both can be derived from the statistical mechanics.

According to one embodiment of the present invention, PLANN is described as implemented in an analog VLSI. Of course, it will be readily appreciated by those of ordinary skill in the art that the invention is not limited to the embodiments described herein. The invention can also be implemented in other kinds of computational media that allow these two principles of computation.

BRIEF DESCRIPTION OF THE DRAWINGS

The invention will be more readily understood with reference to the embodiments illustrated in the attached drawing figures, in which:

FIGS. 6A-6C are tables of experimental results obtained with an embodiment of the present invention and data from a zoo database;

FIG. 7 is a table of experimental results obtained with an embodiment of the present invention and data from a primary tumor data set.

In the drawing figures, it will be understood that like numerals refer to like features and structures.

DETAILED DESCRIPTION OF THE PREFERRED EMBODIMENTS

Figure 1:
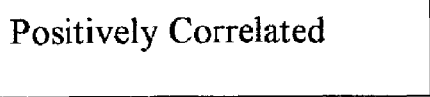
FIG. 1 illustrates the relationship of mutual information and neuron weight connections according to an embodiment of the present invention.
Figure 1:
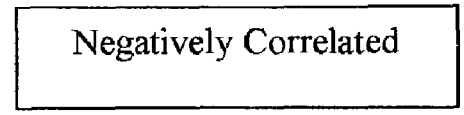
Figure 1:
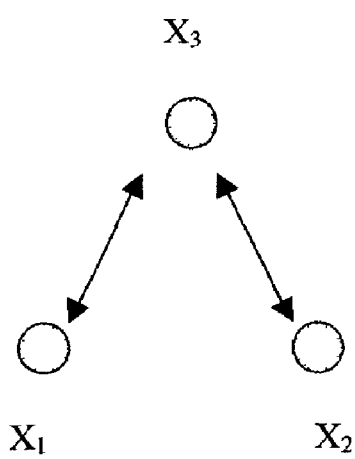

The preferred embodiments of the invention will now be described with reference to the attached drawing figures. FIG. 1 illustrates the relationship of mutual information and neuron weight connections. The PLANN model is a neural network with weight connection between neuron X and neuron Y given as follows $$\omega_{12} = \ln(P(X, Y)/P(X)P(Y)), \quad (1)$$

which contains the firing history or mutual information content of two neurons. As illustrated in FIG. 1, from equation (1) we see that:

$\omega_{12}>0$ if X and Y are positively correlated, $\omega_{12}<0$ if X and Y are negatively correlated, $\omega_{12}=0$ if and only if X and Y are statistically independent. (2)

Figure 2:
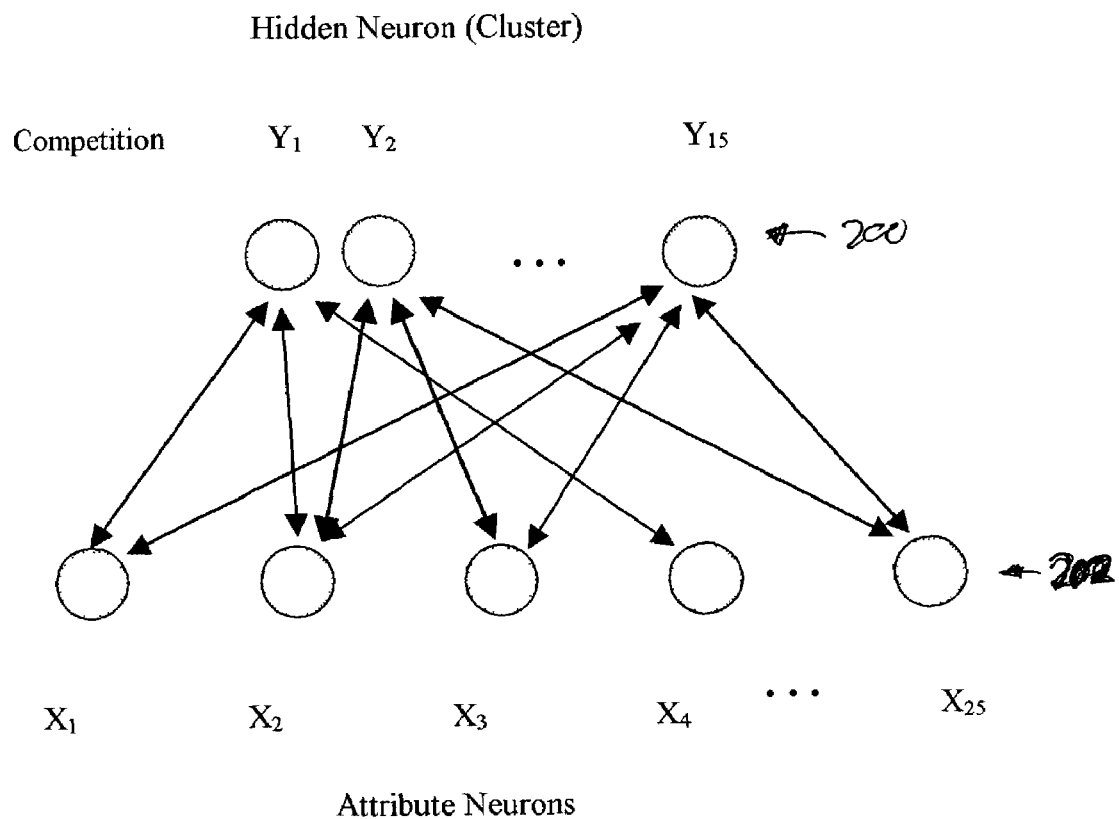
FIG. 2 illustrates the architecture of an unsupervised neural network according to an embodiment of the present invention.

Neurons are often assembled into neighboring groups. The firing pattern of neurons depends on the relative strength of other neurons in its group, which is achieved through the global feedback inhibition to induce the competition. By normalization, the firing pattern of the neuron ensemble can be interpreted as the $\alpha$-cut operation of the fuzzy set; and the signal strength is rescaled according to the statistical mechanics. FIG. 2 illustrates the architecture of an unsupervised neural network according to an embodiment of the present invention. In unsupervised learning, the network preferably comprises one input data layer 202, and one hidden layer 200 that is free running. Free running means the layer is initialized randomly. The input neurons 202 generate signals, and the hidden neurons 200 receive aggregated input signals (action potential). The hidden neurons 200 compete for activation, then generate signals (normalized action potential or activation level) and send the signal back to the input neurons 202. The input neurons 202 receive the action level signals from the hidden neurons 200, but are "clamped," so that their values do not change (unless there were omitted initial input values). The feedback process continues between input and hidden neurons until the network stabilizes.

A group of competitive neurons $y_1, y_2, \ldots y_n$ 200 receive input signals from a group of attribute neurons $x_1, x_2, \ldots x_m$ 202. The activation of the neuron ensemble 200 is given as follows:

$y_j = s(\Sigma_i \omega_{ij} x_i)$, $\forall j$, $\exp(\Sigma_i \omega_{ij} x_i)/\sup_j \exp(\Sigma_i \omega_{ij} x_i) > \alpha$ $y_j = 0$, otherwise, (3)

where $s(t_j) = \exp(\Sigma_i \omega_{ij} x_i)/\Sigma_j \exp(\Sigma_i \omega_{ij} x_i)$, which is usually referred to as the softmax. Equation (3) tracks pattern information and purges the noise, which utilizes a relative measure. This process enables the neurons to respond sensitively over a wide dynamic range; and it also reduces the computational load of a large-scale network.

Neural networks with selected processes for activation and learning have been discussed in the literature. See, e.g., Fukai, T. and Tanaka, S., "A Simple Neural Network Exhibiting Selective Activation of Neural Ensembles: From Winner-Take-All to Winner-Share-All," *Neural Computation* 9, pp. 77-97 (1997), and Körding, K. P. and König, P., "A Learning Rule for Dynamic Recruitment and Decorrelation," *Neural Networks* 13, pp. 1-9 (2000). These networks are usually referred to as competitive networks or "soft winner-take-all." A network that employs modules for computing soft winner-take-all has computational power similar to a network with sigmoidal gates (see, e.g., Maass, W., "On the Computational Power With Winner-Take-All," *Neural Computation* 12 (11), pp. 2519-2536 (2000)). In the model of Körding and König (2000), the increase of firing rate induces a decrease in synapse efficacy, which is also similar to the PLANN learning rule based on mutual information content.

For a competitive network, the neurons receive weighted information and compete for activation. Mathematically this process combines sum and max operations, and becomes the t-conorm operation (both sum and max are t-conorm); and under the signal transformation we have the t-norm operation as described in the fuzzy application of statistical evidence (FASE) (Chen, Y. Y., "Fuzzy Analysis of Statistical Evidence," *IEEE Transactions in Fuzzy Systems* 8, pp. 796-799 (2000)) and the plausible neural network model described in U.S. patent application Ser. No. 09/808,101.

The alternating of two different styles of computation is an important principle discussed in machine learning literature from various perspectives. It corresponds to a linear system with a nonlinear transfer function (see, e.g., Kosko, B., *Neural Networks and Fuzzy Systems—A Dynamical Systems Approach to Machine Intelligence* (1992)), an analog computation with digital selection (see, e.g., Hahnloser, R., Sarpeshkar, R., Mahowald, M., Douglas, R., and Seung, S., "Digital Selection of Analogue Amplification Coexist in a Cortex-Inspired Silicon Circuit," *Nature*, Vol. 405, pp. 947-951 (2000)), and an E-M algorithm. It has been applied to several sensory attention problems.

According to an embodiment of the present invention, a plausible neural network is a universal data analysis method. It extracts a pattern of data information and transforms it into knowledge and inference.

According to an embodiment of the invention, a competitive neuron ensemble comprises a plurality of neurons, and corresponds to a variable in the statistical inference, with each neuron in the ensemble representing a possible value of the variable. The variable can be continuous or discrete, and it can represent a sample space or a hypothesis space. If the variable is discrete with k categories, it can be encoded by $X=(X_1, X_2, \ldots, X_k)$. Thus, each neuron is an indicator function of a particular data value. If the variable is continuous, since the number of competitive neurons is finite, the analog data is coded as complementary fuzzy sets; this process is known as fuzzification.

Let $X=(\tilde{A}_1, \tilde{A}_2, \ldots, \tilde{A}_k)$ be the fuzzy set representation of the variable X, then the probability density function of X is $$P(X=x) = \Sigma_i \mu(\tilde{A}_i(x)) P(\tilde{A}_i),$$ (4)

where $\mu(\tilde{A}_i(x))$ is the fuzzy set membership function, and $\Sigma_i \mu(\tilde{A}_i(x)) = 1$. The fuzzy set membership function corresponds to the activation level of neuron $\tilde{A}_i$ given input x. Equation (4) only involves the weighted sum, which is natural in neural computation.

Unlike categorization, fuzzification will not induce information loss; advantageously the data can be recovered through defuzzification. With vector coding and fuzzification the treatment of discrete and continuous variables are unified. The missing data is treated as a null vector and provides no information, and all of the remaining non-missing data can be used for analysis; thus a neural network according to an embodiment of the present invention can take as many variables as possible and utilize every bit of data information.

From a mathematical point of view, each variable is a fuzzy set, which includes the crisp set as a special case. With the fuzzy set representation, we can design the same network computation for inference of classification and regression, which can be applied to structural patterns such as image recognition. Similarly, we can design the same network computation for inference of Markov chain and time series, which can be applied to temporal patterns such as speech recognition. (Most of the current speech recognition methods require separate modules of Hidden Markov Model (HMM) and temporal neural networks.) From the logic point of view, the fuzzy set serves as the bridge between symbolic and numerical computation; it is important for natural language processing and belief judgment.

If the group of neurons represents a hypothesis space, then the firing neurons produce a confidence set where an input pattern matches with the stored pattern of a latent variable or hypothesis. The threshold is similar to the vigilance parameter of the ART network described in Carpenter, G. and Grossberg, S., "The ART of Adaptive Pattern Recognition by a Self-Organizing Neural Network," *IEEE Computer*, Vol. 21 (3), pp. 77-88 (1988). The stable state of the network is also similar to the resonance of ART.

Figure 5:
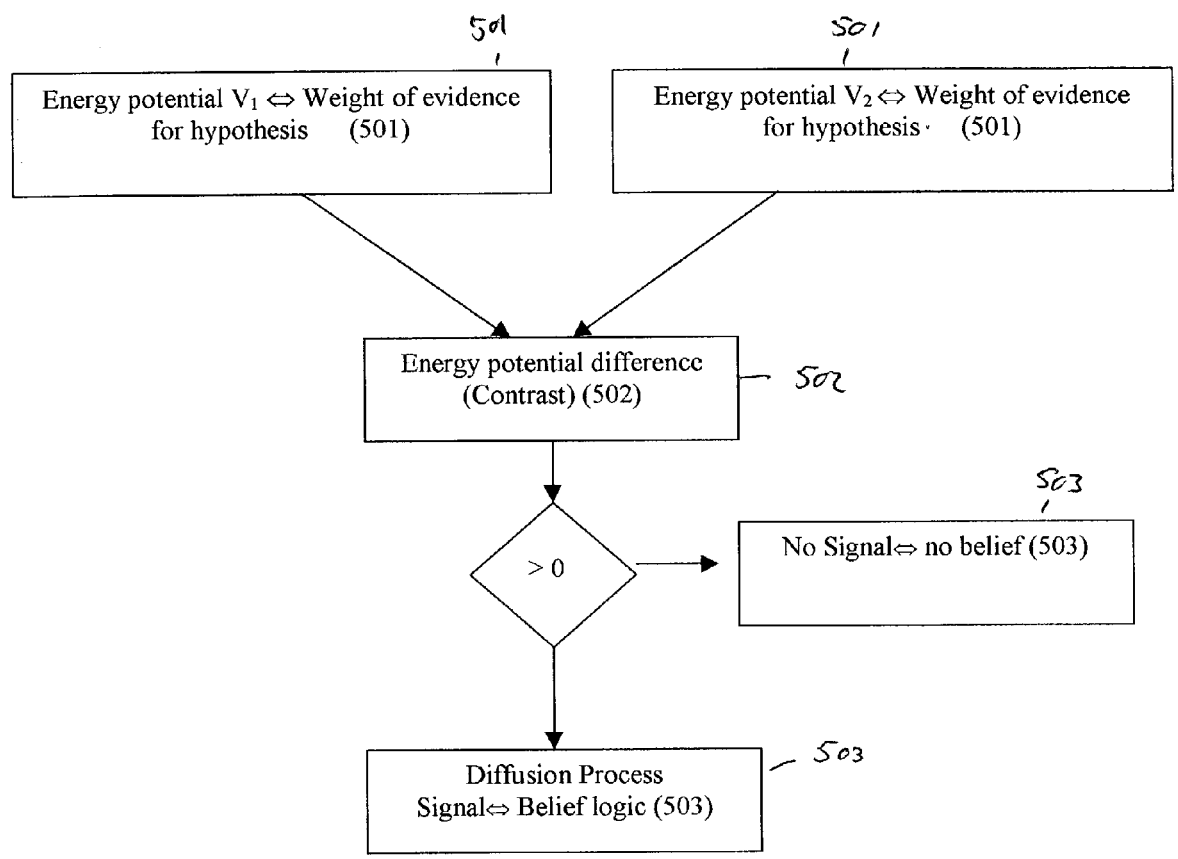
FIG. 5 illustrates the relationship between the diffusion process and belief logic according to an embodiment of the invention.

Unsupervised learning induces factorial encoding (Barlow (1989)). FIG. 5 illustrates the relationship between the diffusion process and belief logic. Thus, in higher levels of neural processing, if $y_1$ and $y_2$ are two competitive hypothesis, which receive the input from $x_1, x_2, \ldots x_n$, their action potentials are:

$$\Sigma_1 \omega_{ij} x_i = \Sigma_i \ln(p(x_i|y_j)) - \Sigma_i \ln(p(x_1)) \text{ (step 501)} \quad (5)$$

If the weight of evidence for $y_2$ is larger than $y_2$, the difference of their action potentials is:

$$\ln((p(x_1, x_2, \ldots x_n|y_1)/(p(x_1, x_2, \ldots x_n|y_2)) \text{ (step 502)}. \quad (6)$$

By taking the signal transform we have Bel $(y_2|x_1, x_2, \ldots x_n)$ (step 503). (see, e.g., Chen, Y. Y.; "Statistical Inference Based on the Possibility and Belief Measures," *Trans. Amer. Math. Soc.*, Vol. 347, pp. 1855-1863 (1995)).

The log of the likelihood ratio is often referred to as the weight of evidence. Note that (6) does not have the biased term $\ln(p(y_1)/p(y_2))$, as occurs in the Bayesian inference.

Figure 3:
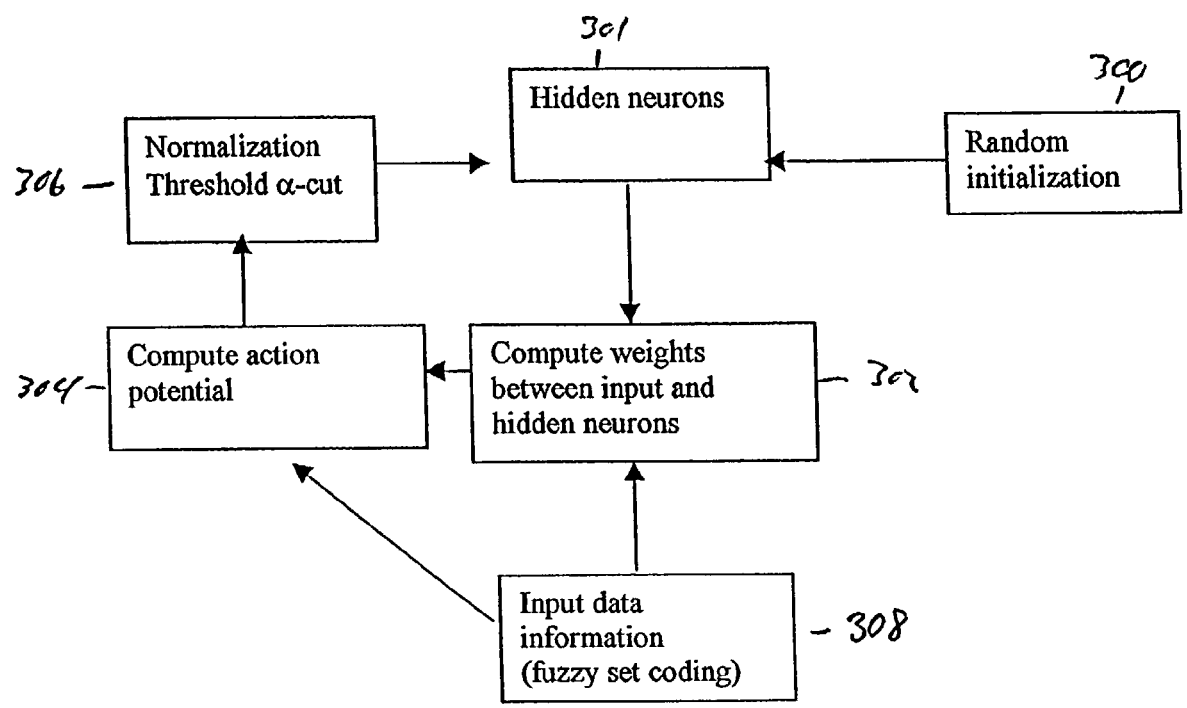
FIG. 3 is a flowchart illustrating an unsupervised learning algorithm according to an embodiment of the present invention.

PLANN is a recurrent neural network, allowing it to have full interconnections. However, a layer network is more efficient in energy conservation, which is favored by nature in organization. A simple two-layer network with one input layer and one hidden layer has been experimented. The learning algorithm with hidden neurons is intrinsically an E-M algorithm, which is illustrated in the flowchart of FIG. 3, and given as follows:

1. Fire the hidden neurons randomly (Step 300, 301).
2. Input data information (fuzzy set coding) (Optional Step 308).
3. M-step: estimate the weight connections of input neurons with hidden neurons (Step 302).
4. E-step: compute the action potentials of hidden neurons and normalize into [0,1] (Step 304). If the activation level of a neuron is larger than threshold, $\alpha$, then it fires (Step 306).
5. Update the synaptic weight if the firing of the hidden neuron changes (301).
6. Repeat the procedure until the network stabilizes.

Figure 4:
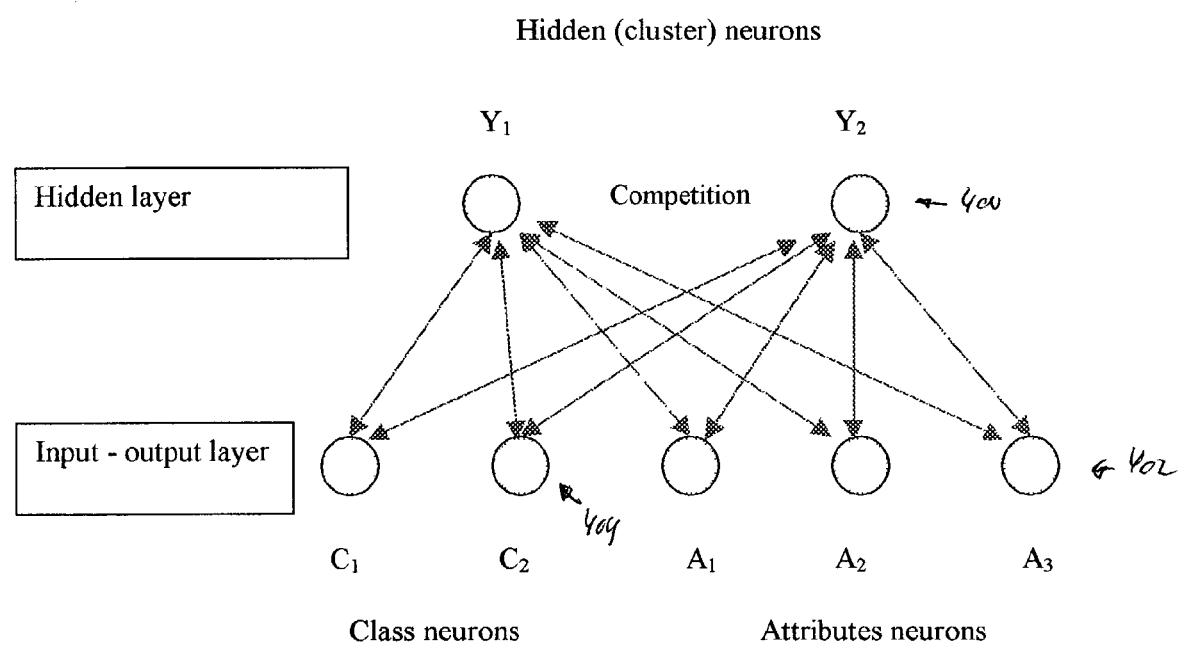
FIG. 4 illustrates the architecture of a supervised neural network according to an embodiment of the present invention.

As shown in FIGS. 2 and 4, the hidden neurons 200, 400 are the latent variables. Each latent variable represents a cluster of positively associated neurons 202, 402 after training. As long as there are hidden neurons 200, 400 free running, they can pick up the new pattern and the old memory will not be eroded.

The E-step 304, 306 is equivalent to soft winner-take-all. A network that employs modules for computing winner-take-all has similar computation power to a network with sigmoidal gates.

This learning algorithm can be used for both supervised and unsupervised learning, the difference being whether the input neurons contain the class label information or not. As shown in FIG. 4, where class information neurons 404 are provided, supervised learning occurs. If part of the class label information is missing, then it is semi-supervised learning.

The PLANN algorithm has been tested on the datasets of the UCI machine learning repository (see Blake, C. L., and Merz, C. J., *UCI Repository of Machine Learning Databases* (1998) (http:///wwwv.ics.uci.edu/~mlearn/MLRepository.html)) for supervised and unsupervised learning. It can extract multi-dimensional pattern such as tic-tac-toe and led data. The weights of the trained network can be easily transformed into uncertainty measure. We demonstrate this feature by using the zoo dataset.

FIG. 6 shows the network output of the PLANN unsupervised learning algorithm for the zoo data (the class type in the data is not used). It is trained with fifteen hidden neurons, as illustrated in FIG. 2. Of course, the selection of fifteen hidden neurons 200 is merely exemplary, and one of skill in the art will readily appreciate that any other number of hidden neurons could be appropriate for a given situation within the scope of the present invention, as defined in the claims. After training ten clusters are formed. FIG. 6(a) shows the output probabilities, which are transformed from the weights of the network. Simple inference rules can be derived from the table illustrated in FIG. 6(b). This table gives the list of animals in the clusters. As shown, the networks find distinctive patterns regardless of the training sample size. The normalized action potential after training can provide the possibility measure of the hidden neurons, which can be interpreted as the fuzzy membership of data input belonging to a cluster. They are summarized in the table of FIG. 6(c). For example, "mink" belongs to cluster $C_5$, but it also belongs to cluster $C_3$ with a possibility of 0.96.

Now supervised learning will be described in conjunction with the exemplary Primary Tumor Domain data set. The primary tumor data set contains 339 oncology cases. Each tumor is described by 18 attributes including the class label, which represents the 22 different locations of tumors. Due to the complexity of the knowledge domain, the limited number of attributes and the available sample size, prediction of the tumor is often erroneous. The accuracy of classification of primary tumor data for most inference methods is below 50 percent. The critical question is if the uncertainty of the inference can be properly addressed.

As shown in FIG. 4, a two-layer neural network with one input layer 402, 404 and one hidden layer 400 was constructed. The input layer consists of both class 404 and attribute 402 neurons. The test is performed by inputting the attribute values, which feed forward to the hidden neurons 400 and then feed back to the class neurons 404. FIG. 7 shows the relationship of threshold, accuracy of prediction, and average number of class neurons that fire in the experiment. Similar to other classification methods, the prediction based on maximum posterior probability has low accuracy. However, we can narrow down the prediction to two or three types of tumor with a high degree of accuracy.

According to an embodiment of the present invention, the network is a belief network after training, which is a domain related expert system. For knowledge extraction we can input the value of a variable and observe the output of another related variable value, which will be active if it has large contrast within the group of competitive neurons. This associated knowledge is equivalent to the logical proposition of "if A then B". For example in the trained network of primary tumor data, we obtain that "If the tumor location is ovary then it is not supraclavicular" (CF=0.97). The certainty factor is transformed from the difference of the action potentials.

Figure 8:
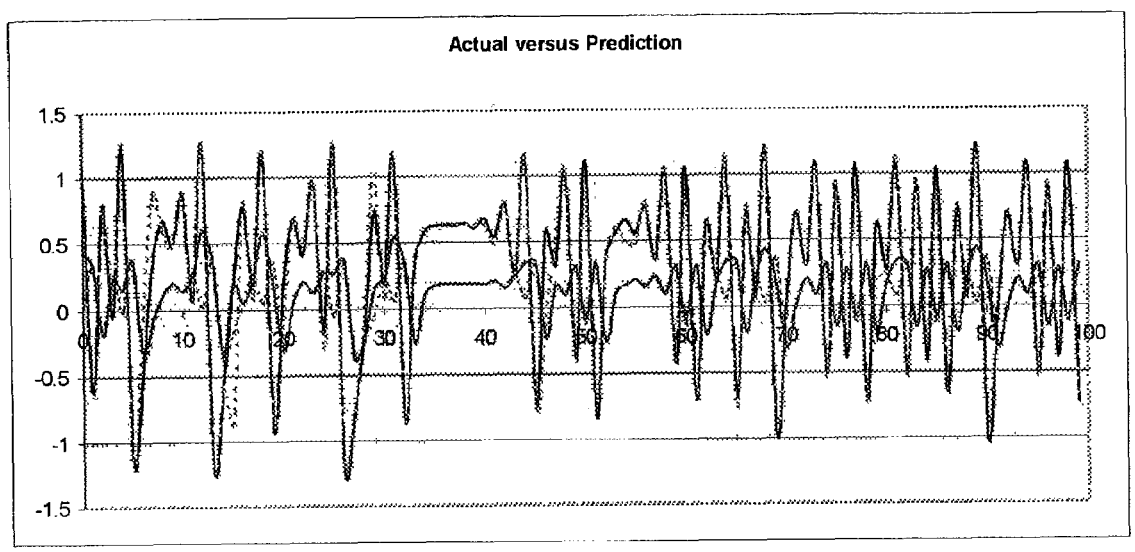
FIG. 8 illustrates experimental results obtained with an embodiment of the present invention.

When the class variables are continuous in supervised learning, PLANN inference can perform both function and relation estimation. Function estimation of the PLANN inference is demonstrated by analyzing the data of a Henon map, which is a well-known chaotic dynamic system. The Henon map consists of two interactive variables with a nonlinear relationship evolving through time. The data is trained with the time series and a first order time lag. For predictions we input the lagged time series in the trained network, and compute the fuzzy centroid of the output values. This process is referred to as defuzzification. FIG. 8 shows the experimental result of the PLANN inference. It predicts correlated multiple time series simultaneously, which is a difficulty for many other inference methods.

In the physics of computational systems, if there is no energy potential difference between the communication channels, there is no diffusion process; and no signal can be detected. Thus, the contrast computation is used extensively in neuromorphic circuit systems. For example, in visual neural systems the difference of the spatial potentials computes edge detection; in auditory neural systems the difference of the temporal potentials compute the sound detection. According to an embodiment of the present invention, the contrast of evidence potentials of rival hypotheses computes the belief judgment.

The circuit design for PLANN is based on the analog VLSI neuromorphic circuits (Mead (1989)). One of the basic neuromorphic circuits is transconductance. In the differential transconductance amplifier, the differential pair of the two drain currents is $$I_1 = I_b \exp(\kappa V_1)/(\exp(\kappa V_1) + \exp(\kappa V_2)) \text{ and}$$

$$I_2 = I_b \exp(\kappa V_2)/(\exp(\kappa V_1) + \exp(\kappa V_2)), \quad (7)$$

where $\kappa$ is a process-dependent parameter. Under a subthreshold regime of operation (low power), voltage and current follow the log and exponential relationship. The two currents can be considered as complementary probability p and 1−p multiplied by the bias current $I_b$. The actual bias current is not important, since the rudimentary nature of "uncertainty measure" is the relative odd. From equation (7) the log likelihood ratio is $$\ln(p/(1-p)) = \ln(I_1/I_2) = \kappa V_1 - \kappa V_2 \text{(FIG. 5, step 502)} \quad (8)$$

which is equivalent to equation (6). The voltages are corresponding to the weight of evidence of rival hypotheses, and the currents are corresponding to the probability or possibility.

By extending the differential transconductance to n units, we have the winner-take-all (WTA) circuit (see, e.g., Lazzaro, J., Ryckebusch, S., Mahowald, M. A., Mead, C.; "Winner-Take-All Networks of O(n) Complexity," *Advances in Neural Processing Systems*, Vol. 1, pp. 703-711 (1989); Elfadel, I. M. and Wyatt, J. L., "The Softmakx Nonlinearity: Derivation Using Statistical Mechanics and Useful Properties As A Multi-Terminal Analog Circuit Element," *Advances in Neural Information Processing Systems*, Vol. 6, pp. 882-887 (1994); and Asai, T., Fukai, T. and Tanaka, S., "A Subthreshold MOS Circuit for Lotka-Volterra Neural Network Producing the Winner-Share All Solution," *Neural Networks*, Vol. 12, pp. 211-216 (1999)). The WTA circuit computes the output current:

$$I_i = I_b \exp(\kappa V_i)/\Sigma_{j=1, \ldots, n} \exp(\kappa V_j), \quad (9)$$

The WTA circuit is a recurrent network with global inhibition feed back to all units. With an additional transistor controlling the bias voltage, the outputs produce multiple winners or a single winner (see, e.g. Liu, S. C., *A Winner-Take-All Circuit with Controllable Soft Max Property* (2001)). This corresponds to the α-cut operation of the fuzzy set. The WTA combines fuzzy set operation and probability normalization into a single computation (equations (2) and (3)).

Another way to change the computation properties of WTA is by adding the lateral exhibition and/or inhibition as taught in Indiveri, G., "Winner-Take-All Networks With Lateral Excitation," *Analog Integrated Circuits and Signal Processing*, Vol. 13, pp. 1-9 (1997); and Indiveri, G., "A Current-Mode Hysteretic Winner-Take-All Network With Excitatory and Inhibitory Coupling," *Analog Integrated Circuits and Signal Processing*, Vol. 28, pp. 279-291 (2001)). The lateral exhibitions will spread the electronic stimulus to its neighboring neurons; such distributed representations have been observed in many brain areas and has been referred to as population codes. Mathematically, this distributed representation can be interpreted as the fuzzy set coding of a continuous variable, or redundant coding of a discrete variable. The circuit is self-normalized, i.e. the output computes the average of input currents. The redundancy of circuit units enhances the robustness of computation, and overcomes the mismatches of circuit devices.

According to an embodiment of the present invention, both discrete and continuous variables are represented by a WTA circuit, and thus computed by the same network design. The WTA with follower-aggregation circuit (see, e.g., Mead, C., *Analog VLSI and Neural Systems* (1989)) computes the static relationship of spatial signal. The WTA with follower-integrator circuit (Mead (1989)) computes the dynamic relationship of temporal signal.

When a neuron receives current input from other neurons, its membrane potential will increase. The neurons in an assembling group compete for action, if membrane potential passes a threshold, a spike will generate. The neuron that receives stronger signals will fire first, and produce stronger amplitude. The circuit design of Integration-and-Fire neuron chip with competitive network is described in Asai et al. (2002).

To implement PLANN learning, the synapse in the Integration-and-Fire neuron chip need to be adaptive with nonvolatile memory, the circuit design for such a device is discussed in Diorio, C., Hsu, D., and Figueroa, M.; "Adaptive CMOS: From Biological Inspiration to Systems-On-A-Chip," *IEEE Proceedings* 90, Vol. 3, pp. 345-357 (2002), which is referred to as the silicon adaptive synapse.

In PLANN learning, if a spike of a pre synaptic neuron X is followed by a spike of a postsynaptic neuron Y within a small delay-learning window, then the weight increases. If no spike is generated by the postsynaptic neuron, then the weight decreases. The details of the leaning algorithm are discussed in U.S. patent application Ser. No. 09/808,101 and in Chen, Y. Y.; "Plausible Neural Networks," *Advances in Neural Networks World*, pp. 180-185 (2002). This computation of weight update can be implemented by the silicon adaptive synapse as discussed in Shon, A., Hsu, D. and Diorio, C.; Learning Spike-Based Correlations and Conditional Probabilities in Silicon; Advanced Neural Information Processing Systems, vol. 14 (2002).

While the invention disclosed herein has been described by means of specific embodiments and applications thereof, numerous modifications and variations can be made thereto by those skilled in the art without departing from the scope of the invention as set forth in the claims.

What is claimed is:

1. A method of training a neural network comprising a plurality of neurons having weights connections between respective ones of said neurons to compute plausible inference based on data information, the process comprising the steps of:
   (a) firing each of a plurality of input neurons, with an analog signal valued between 0 and 1, to a group of neurons connected to each respective fired input neuron;
   (b) receiving the weighted sum of signals at a plurality of hidden neuron, which is the action potential;
   (c) competing for activation among said plurality of hidden neurons;
   (d) for each hidden neuron, if the ratio of its action potential and the highest action potential passes a threshold, firing said hidden neuron, otherwise remaining at rest; and
   (e) normalizing the action potential in the group of hidden neuron, said normalized action potential comprising the signal of the neuron output.

2. The method of claim 1, wherein said neural network is a parallel distributed computation machine comprising:
   at least one input layer and at least one output layer;
   the input layer comprising a plurality of input neurons, and the output layer comprising a plurality of output neuron, such that each of neurons has a weight connection to at least one other neuron.

3. The method of claim 2, wherein a signal of the output node comprises logic values which represent a probability of an event, a truth of a proposition, or a fuzzy set membership function.

4. A method of data coding in a plausible neural network, the method comprising the steps of:
   (a) training said network with training data having a variable associated therewith, said variable comprising an ensemble of neurons; wherein each neuron in said ensemble represents a fuzzy subset of the said variable; and
   (b) activating each of said neurons in said ensemble with a certain degree based on a data value of said training data, wherein the activation level of each neuron in said ensemble is a fuzzy set membership function between 0 and 1, and a sum of activation levels of said ensemble of neurons sums to 1.

5. A method of training a plausible neural network comprising at least one input layer of attribute neurons, and at least one hidden layer of cluster neurons for unsupervised learning or cluster analysis, the method comprising the steps of:
   (a) firing said plurality of cluster neurons in the hidden layer randomly;
   (b) computing the weight connections between the said cluster neurons and the attribute neurons;
   (c) inputting the attribute neurons again and computing the activation of the cluster neurons;
   (d) updating the weight connections between the cluster neurons and the attribute neurons based on mutual information content between respective cluster and attribute neurons; and
   (e) repeating steps (c) and (d) until the network stabilizes.

6. A method of training and testing a neural network, comprising at least one input layer and at least one hidden layer, said input layer comprising a plurality of attribute neurons and a plurality of class neurons, said hidden layer comprising a plurality of cluster neurons, for supervised learning and semi-supervised learning, the method comprising the steps of:
   training said neural network comprising the steps of:
   (a) firing said plurality of cluster neurons in the hidden layer randomly;
   (b) computing the weight connections between said cluster neurons and the input layer neurons;
   (c) inputting the class and attribute neurons again and computing the activation of the cluster neurons;
   (d) updating the weight connections between the cluster neurons and the input layer neurons based on mutual information content between respective cluster and input layer neurons; and
   (e) repeating steps (c) and (d) until the network stabilizes;
   and testing said neural network comprising the steps of:
   (f) inputting the attribute neurons and computing the activation of the cluster neurons; and
   (g) firing said cluster neurons back to said class neurons.

7. A method for knowledge extraction from a plausible neural network, the method comprising the steps of:
   (a) inputting a data value to a plurality of class/attribute neurons;
   (b) computing a contrast between said class/attribute neurons based on the relative magnitude of action potential of the connected class/attribute neurons;
   (c) transforming said contrast into a degree of belief determined from a difference in activation level between a class/attribute neuron and the activation level of its rivals; and
   (d) outputting the value of a class/attribute neuron if said contrast exceeds a predetermined level.

8. A machine adapted to perform the computations of a plausible neural network, said machine comprising:
   an analog circuit device under subthreshold region of computation, wherein a voltage and a current follow log and exponential relationships;
   an output device and an input device,
   a processor; and
   a memory having machine executable instructions for performing a series of functions stored therein, and adapted to receive and store a series of data records, said functions including:
   (a) receiving training data at said input device, said training data comprising a plurality of records, each record having data values associated therewith, wherein said training data is a vector comprising an analog signal between 0 and 1, corresponding to fuzzy set coding;
   (b) inputting the said vector into a winner-take-all (WTA) circuit comprising a plurality of weight connections adapted to compute the activation of said plausible neural network by adjusting the weight connections based on mutual information content, wherein said current corresponds to a probability and said voltage corresponds to a weight of evidence in a plausible inference; and
   (c) applying said voltage through a transconductance amplifier, wherein a voltage difference produces a signal representing the belief judgment of rival hypothesis.

9. The machine of claim 8, further adapted for trained using training data by updating the weight connections between the processing units, said functions further comprising:

(a) receiving training data at said input device, said training data comprising a plurality of records, each record having a variable and data values associated therewith; and
(b) updating the connection weights between two neurons whenever either of the connected neurons fire.

10. The machine of claim 9 wherein said step of updating the connection weights is implemented by an adaptive silicone synapse.

11. The machine of claim 8 wherein said machine is further adapted to provide an expertise response and an uncertainty assessment based on input information.

12. The machine of claim 11, wherein said machine is adapted to be utilized as a component of a plausible thinking machine.

* * * * *